Patented July 16, 1935

2,007,984

UNITED STATES PATENT OFFICE 2,007,984

METHOD OF SLACKENING ANIMAL HIDES AND SKINS AND SLACKENING SOLUTIONS

Bernhardt Quendt, Essen, Germany

No Drawing. Application September 20, 1933, Serial No. 690,287. In Germany August 1, 1931

13 Claims. (Cl. 149—2)

This invention relates to a method of slackening animal skins and hides according to either the single or the two bath process, and to slackening solutions employed in the method in question, and has for its object the preservation of the hairs while at the same time paying careful consideration to the substance of the skin.

According to the invention, there is employed a slackening solution free of alkali metal ions and adjusted to pH 9–10, which solution is produced by the introduction of sulphide of hydrogen into a solution containing ions of an alkaline earth metal and ammonia. To strengthen the hair side of the skin advantage will be found in employing a slackening solution which also contains arsenic salts.

Since when employing slackening solutions of this nature the action takes place on occasion in irregular fashion, so that the same is delayed, for example, along the back and at the claws as compared with other parts of the skin, it is desirable to add to the slackening solution also a moistening agent, such as hexamethylene tetramine. Moistening agents of this kind have not the least detrimental effect on the favorable action of the sulphide of hydrogen, which is introduced in gaseous form, as regards the preservation of the hairs.

The skins are subjected in the usual fashion either in pits, vats or the like to the action of the slackening solution, possibly with the addition of lime, and are subsequently treated in the known fashion in white lime as required. The hairs may be removed quite readily after this treatment, and have not been attacked to the least extent.

Examples

The slackening solution may be produced in the following manner:

1. To 40–50 parts concentrated ammonia (25% $NH_3$) there are added 50 parts water having dissolved therein .5 parts barium hydroxide ($Ba(OH)_2 8H_2O$), there then being added to the solution 1.5–2.5 parts in weight of sulphide of hydrogen. There may then be added 1% arsenious acid or a similarly acting substance.

2. To 50 parts concentrated ammonia solution (25% $NH_3$) there are added 50 parts water, in which have been dissolved .5 parts strontium hydroxide ($Sr(OH)_2 8H_2O$), there then being added one part in weight of sulphide of hydrogen (gas).

3. To 50 parts concentrated ammonia solution (25% $NH_3$) there are added 50 parts water, in which have been dissolved .2 parts strontium hydroxide and .8 parts barium hydroxide ($Ba(OH)_2 8H_2O$), there then being added 3 parts in weight of sulphide of hydrogen in gaseous form.

4. To 50 parts concentrated ammonia solution (25% $NH_3$) there are added 50 parts water, in which have been dissolved .333 parts strontium hydroxide, .333 parts slaked lime $Ca(OH)_2$ and .333 parts barium hydroxide, there then being added 1 part in weight of sulphide of hydrogen gas.

5. To 25 parts concentrated ammonia solution (25% $NH_3$) there are added 50 parts water, in which have been dissolved 1 part barium sulphide (BaS) and 1 part calcium sulphide (CaS). There are then added two parts by weight of sulphide of hydrogen in gaseous form.

6. To 40 parts concentrated ammonia solution (25% $NH_3$) there are added 50 parts water, in which there have been dissolved .5 parts each of barium sulphide (BaS) and calcium sulphide (CaS). There are then added 2 parts by weight of sulphide of hydrogen in gaseous form.

7. To 50 parts concentrated ammonia solution (25% $NH_3$) there are added 50 parts water, in which have been dissolved .5 parts barium hydroxide. There is then added 1 part by weight of sulphide of hydrogen in gaseous form.

8. To 50 parts concentrated ammonia (25% $NH_3$) there are added 50 parts water, in which there have been dissolved .5 parts barium hydroxide ($Ba(OH)_2.8H_2O$), there then being introduced into the solution 1.5–2.5 parts by weight of sulphide of hydrogen in gaseous form. There is then added 1% sulphide or arsenic. Finally there is admixed with the solution ½–1 part by weight of hexamethylene tetramine, which readily dissolves.

9. 10 kilogrammes of $Ba(OH)_2.8H_2O$ are dissolved in 200 litres of water, there then being added 200 litres of concentrated ammonia solution (25% $NH_3$). There is then introduced into the solution sulphide of hydrogen in such an amount as will be liberated from 2 kilogrammes FeS under the action of acid. There are then added 1% sulphide of arsenic or a corresponding arsenic salt and 3 kilogrammes of hexamethylene tetramine.

The proportions set forth in the above examples are all reckoned according to weight.

The slackening process is conducted with one of the above solutions as follows:

10. In to a pit containing 10 cubic metres of water there are introduced 100 kilogrammes of the slackening solution and the whole well stirred, there then being immersed 30 skins. Before immersing the skins some hydrochloric acid must be added if the pH value of the liquid is more than 10, but often it is not necessary. When a perceptible loosening of the hairs takes place (after approximately 6-20 hours) the skins are allowed to drip, and are introduced into a normal lime slackener, which is frequently agitated. Better still there is employed for this purpose an agitation pit. After 1-3 days the hairs may be readily removed from the skins. Into the pit there are introduced 10 kilogrammes fresh slackening solution for 30 new skins. This slackener may be used 10-18 times with an addition of 10 kilogrammes fresh slackening solution on each occasion.

11. 75-150 kilogrammes of one of the above stated slackening solutions are introduced into a pit containing 10 cubic metres of water, whereupon 40 skins are immersed for 6-20 hours in this slackener, which requires frequent agitation. After a subsequent lime slackening treatment lasting 1-3 days the hairs may be readily removed from the skins. After regeneration by approximately 12.5 kilogrammes fresh slackening solution a further 40 skins are immersed. This regeneration is performed for three further batches. The pit is then allowed to run half empty, whereupon there are added 5 cubic metres fresh water and approximately 50 kilogrammes slackening solution. After slackening 40 skins four further batches may be treated, adding on each occasion 12.5 kilogrammes fresh slackening solution. The pit is then again allowed to run half empty, and 5 cubic metres of fresh water and approximately 25 kilogrammes solution are added.

There may then be treated four further batches after an addition of approximately 12.5 kilogrammes slackening solution, whereupon the pit is completely emptied and cleaned.

12. Into a pit containing 10 cubic metres of pure lime slackener there are introduced 150 kilogrammes of one of the solutions described above, there then being immersed in this solution, which requires frequent agitation, 30 hides or a corresponding number of skins. This treatment lasts for 6-20 hours in accordance with the nature of the skins under treatment. After being allowed to drip the skins are again placed for 3 days in a lime slackener, and the hair may then be removed. Five additional batches each comprising 30 hides or a corresponding number of skins may treated in the same fashion if 10 kilogrammes fresh solution are added on each occasion. If the pit is then allowed to run half empty, and 5 cubic metres of fresh lime slackener and 50 kilogrammes slackening solution are added, 5 batches each comprising 30 hides or a corresponding number of skins may be treated upon reinforcement on each occasion by 10 kilogrammes slacking solution. If then the pit is half emptied and 5 cubic metres of lime slackener filled in with the addition of 25 kilogrammes slackening solution, five further batches of hides or skins may be treated if 10 kilogrammes of fresh slackening solution are added after each batch. The slackener is then exhausted. If the hides or skins are allowed to remain in the first slackener for 2-3 days, the hairs may be removed after the first slackener, which is more desirable in connection with leather for uppers.

13. For vat-slackening purposes there are filled into the vat 6 cubic meters of water and 150 kilogrammes of one of the stated solutions. There are then immersed 90 skins or hides for a period of approximately 6 hours. After dripping the skins are placed for 3 days in a lime pit. The liquid, which if necessary may be pumped into another receptacle, is then reinforced by the addition of 30 kilogrammes slackening solution, and is then ready for a further batch of 90 skins or hides. Five or six additional batches may be treated in the same fashion. Half of the liquid is then allowed to run off, and 3 cubic metres of fresh water and 90 kilogrammes slackening solution are added. The next three batches are treated after the addition on each occasion of 30 kilogrammes slackening solution. If now half of the liquid is discharged four additional batches may be treated, and afterwards four further batches in the same manner until the slackener is exhausted.

14. The first eight batches are treated in the vat in the manner described in the previous example, half of the liquid run off, the same procedure adopted as before, and four further batches likewise treated in the manner already described. Half of the liquid is then again discharged, 3 cubic metres of water and 60 kilogrammes slackening solution added, 90 skins or hides treated, 30 kilogrammes slackening solution then introduced, and treatment performed with a further 90 hides. Half of the liquid is then again allowed to run off and 3 cubic metres of water and 45 kilogrammes slackening solution added, and 90 skins or hides immersed as a final batch.

What I claim as new and desire to secure by Letters Patent is:

1. A method of slackening animal hides and skins with conservation of the hairs, which consists in treating the said skins with a slackening solution free of alkaline metal ions, the said solution being produced by the introduction of sulphide of hydrogen in gaseous form into a solution containing ions of an alkaline earth metal and ammonia.

2. A method of slackening animal hides and skins with conservation of the hairs, which consists in treating the said skins with a slackening solution free of alkali metal ions, the said solution being produced by the introduction of sulphide of hydrogen in gaseous form into a solution containing ions of an alkaline earth metal and ammonia, and subsequently treating the said skins in a normal lime slackener.

3. A method of slackening animal hides and skins with conservation of the hairs, which consists in treating the said skins with a slackening solution free of alkali metal ions, the said solution being produced by the introduction of sulphide of hydrogen in gaseous form into a solution containing ions of an alkaline earth metal and ammonia and arsenic salts.

4. A method of slackening animal hides and skins with conservation of the hairs, which consists in treating the said skins with a slackening solution, and subsequently treating the said skins in a normal lime slackener, the said solution containing ions of an alkaline earth metal, ammonia and arsenic salts and having sulphide of hydrogen introduced into the same in gaseous form.

5. A method of slackening animal hides and skins with conservation of the hairs, as claimed in claim 1, the said solution also containing a moistening agent.

6. A method of slackening animal hides and skins with conservation of the hairs, as claimed in claim 1, the said solution also containing hexamethylene tetramine.

7. A slackening solution, produced by introducing sulphide of hydrogen in gaseous form into a solution containing ions of an alkaline earth metal and ammonia, which is free of alkali metal ions.

8. A slackening solution, produced by introducing sulphide of hydrogen in gaseous form into a solution containing ions of an alkaline earth metal and ammonia, free of alkali metal ions, and adding a moistening agent.

9. A slackening solution, produced by introducing sulphide of hydrogen in gaseous form into a solution containing ions of an alkaline earth metal and ammonia, free of alkali metal ions, and adding arsenic salts.

10. A slackening solution, produced by introducing sulphide of hydrogen in gaseous form into a solution containing ions of an alkaline earth metal and ammonia, free of alkali metal ions, and adding hexamethylene tetramine.

11. A slackening solution, produced by introducing sulphide of hydrogen in gaseous form into a solution containing ions of an alkaline earth metal and ammonia, free of alkali metal ions, and adding arsenic salts and a moistening agent.

12. A slackening agent, produced by introducing sulphide of hydrogen in gaseous form into a solution containing ions of an alkaline earth metal and ammonia, free of alkali metal ions, and adding arsenic salts and hexamethylene tetramine.

13. A slackening solution comprising 50 parts concentrated ammonia (25% $NH_3$), 50 parts barium hydroxide solution (1% $Ba(OH)_2.8H_2O$), approximately 2 parts sulphide of hydrogen, 1% sulphide of arsenic, and 1% hexamethylene tetramine.

BERNHARDT QUENDT.